United States Patent [19]
Buhman

[11] Patent Number: 5,660,267
[45] Date of Patent: Aug. 26, 1997

[54] LIMIT SWITCH ACTUATOR FOR CONVEYOR CHAIN TAKE-UP

[75] Inventor: Chris P. Buhman, St. Joseph, Mo.

[73] Assignee: Mid-West Conveyor Company, Inc., Kansas City, Kans.

[21] Appl. No.: 554,979

[22] Filed: Nov. 13, 1995

[51] Int. Cl.[6] .................................................. B65G 23/44
[52] U.S. Cl. ........................................ 198/810.04; 198/813
[58] Field of Search .............................. 198/810.04, 813; 104/172.1, 172.3, 196

[56] References Cited

U.S. PATENT DOCUMENTS

| | | | |
|---|---|---|---|
| 3,777,879 | 12/1973 | Dehne | 198/810.04 |
| 3,952,864 | 4/1976 | Schlagel | 198/810.04 X |
| 4,470,355 | 9/1984 | Kunlzynski | 198/813 X |
| 4,616,570 | 10/1986 | Dehne | 104/172 B |
| 4,759,438 | 7/1988 | Nevo-Hacohen | 198/810.04 |

FOREIGN PATENT DOCUMENTS 2140759  12/1984  United Kingdom ................... 198/813

*Primary Examiner*—James R. Bidwell
*Attorney, Agent, or Firm*—Litman, McMahon and Brown, L.L.C.

[57] ABSTRACT

An improved limit switch actuator for position indicating limit switches in a drive chain take-up for a power and free conveyor system includes an actuator rod which is movable relative to a take-up cylinder. A flag is attached to the actuator rod and is positioned such that, as the actuator rod is moved relative to the cylinder, the flag actuates a series of position indicating limit switches. The actuator rod is linked to a piston in the take-up cylinder via a connecting plate which is rotatable relative to the piston while the actuator rod remains stable. Thus, the piston is free to rotate under the torque effects of a take-up chain without damage to the actuator rod.

20 Claims, 3 Drawing Sheets

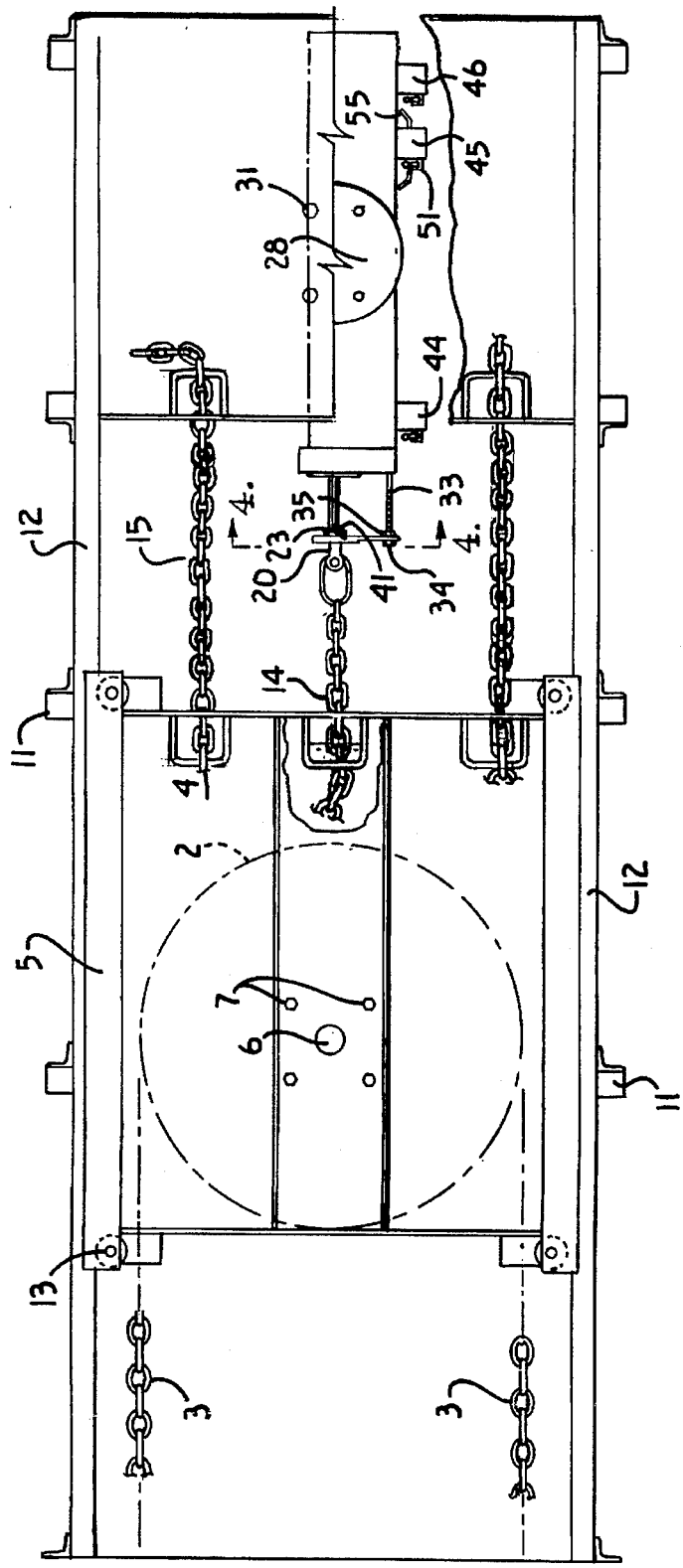
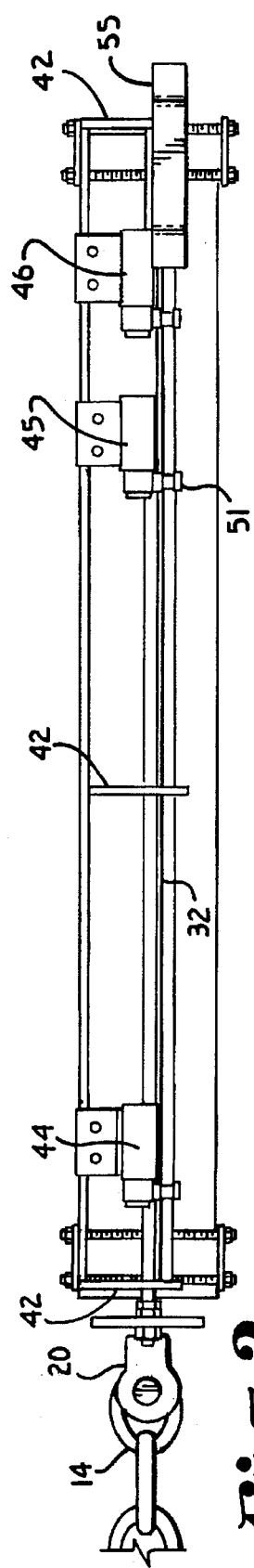
Fig. 2.
Fig. 3.

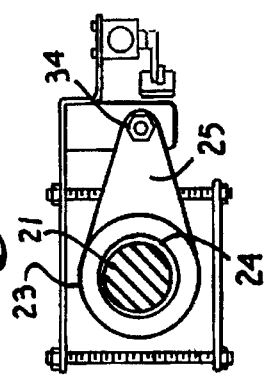
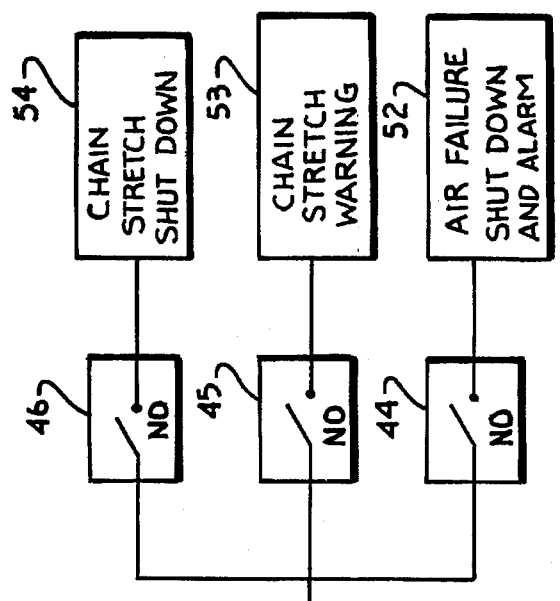
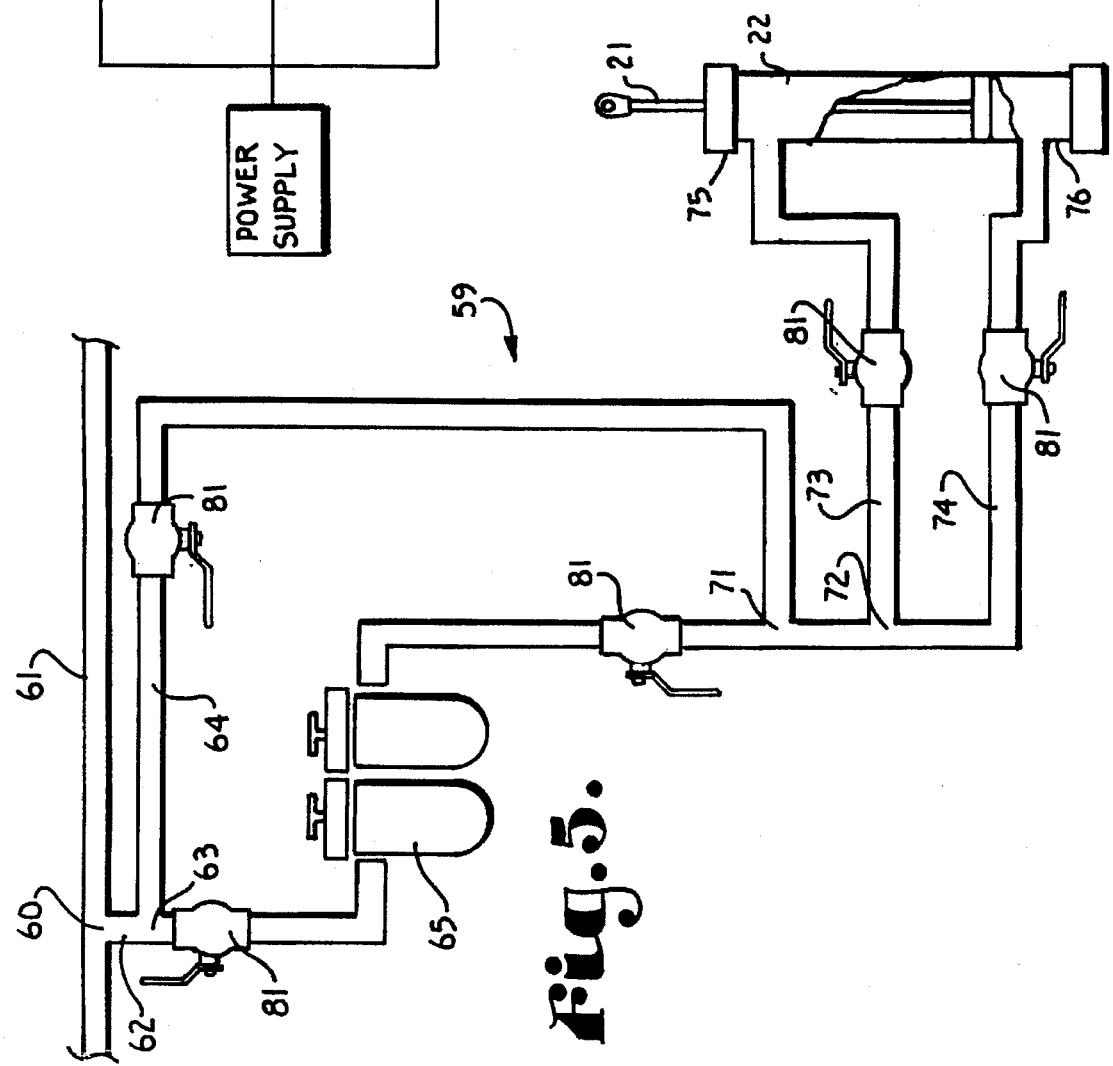

LIMIT SWITCH ACTUATOR FOR CONVEYOR CHAIN TAKE-UP

FIELD OF THE INVENTION

The present invention relates to an improved limit switch actuator for indicating the position of an endless conveyor chain take-up, and more particularly to such an actuator in which a take-up air cylinder and piston are connected to the limit switch actuator by a plate such that chain rotation is accommodated without damage to the chain switch actuator or a limit switch flag mounted thereon.

BACKGROUND OF THE INVENTION

Endless chain drive conveyor systems for moving bulky items through a manufacturing or assembly plant are well known. Such conveyor systems often take the form of "power and free" conveyors which include a "power" and a "free" conveyor track, generally disposed vertically with respect to each other. Operating within the power track is an endless drive chain with drive dogs periodically attached to the chain and extending toward the free track. These drive dogs are oriented to engage a trolley dog or actuator on a drive trolley operating within the free track. While the drive dogs are generally fixed in position relative to the drive chain, the trolley dogs on the drive trolleys are typically selectively retractable.

The free track generally follows the same path as the power track(s) but is spaced vertically relative thereto. As originally implemented, power and free conveyor systems were suspension systems with loads suspended from trolleys or carriers operating in the free track and with the power track disposed above the free track. These suspension systems have reached a high degree of sophistication and can include features such as the ability to stop and accumulate free trolleys in specific accumulating areas and transfer zones which include intersections where loads can be transferred between non-synchronous conveyor systems.

More recently, in response to the specific requirements of the automobile industry, floor mounted or "inverted" power and free systems have been developed. In these inverted systems, the power track and the free track are disposed beneath the floor of the factory, with the free track positioned above the power track. A plurality of load carriages are attached to the free trolleys through a slot in the factory floor. Each load carriage is usually attached to two or more load carrying trolleys with the load carriage being disposed above the floor and driven along the conveyor path by the associated load carrying trolleys.

These inverted systems have the capability of handling bulkier and heavier loads, such as automobile chassis, while minimizing many dangerous conditions found in suspension systems. For example, inverted systems allow workers to safely climb on and off of the load carriages and they eliminate the danger inherent in the swinging loads of suspension systems.

In both suspension and inverted power and free conveyors, the endless drive chain must be adjusted to provide optimum chain tension in the power track. This is done by routing the chain around a large chain take-up pulley which is mounted on a movable carriage. The drive chain enters from a first side of the carriage, makes a 180 degree loop around the take-up pulley and exits the first side of the carriage. A second side of the carriage opposite the first side is connected to a double action take-up pneumatic cylinder and piston via a clevis and chain. The take-up pneumatic cylinder is anchored in place such that, by retracting the piston, the movable take-up carriage is pulled toward the pneumatic cylinder, thus tensioning the chain. The pneumatic cylinder is typically supplied with a constant air pressure to assure a uniform chain tension in the conveyor.

It is important for a variety of reasons to know the position of the take-up carriage. For example, a drive chain for which too much take-up is required to maintain operating tension might be fatigued in whole or in certain links. On the other hand, in the event of failure of the take-up cylinder or the compressed air supply, should all chain tension be lost, a dangerous condition could occur in the conveyor. In order to indicate take-up position, a plurality of limit switches can be positioned alongside the pneumatic take-up cylinder. An actuator rod is oriented in parallel to the pneumatic cylinder piston and is connected to the piston for movement therewith. The actuator rod extends into and is movable relative to a holder which holder is stationary with respect to the pneumatic cylinder. A limit switch actuator flag is attached to the actuator rod such that the limit switches are actuated in turn as the take-up piston is extended or retracted. Indicators and/or conveyor shut downs are connected to be controlled by the limit switches.

During maintenance and repair operations on the conveyor, it is typical for the take-up tension to be released with the chain connecting the take-up carriage to the take-up piston disconnected and then reconnected. Often the chain will be inadvertently twisted, rotating 180 degrees or more at the connecting link, a condition which is difficult to detect. Once the take-up piston is retracted again to reestablish the required chain tension, the several tons of pressure on the take-up chain causes the chain to untwist, at least partially, and often in a violent motion. This untwisting, rotary motion of the take-up chain is transmitted to the take-up piston, which can readily absorb a certain amount of rotary motion. The problem lies in the actuator rod which is attached to the piston. As the piston is rotated, a tremendous amount of torque is imparted to the actuator rod, resulting in a violent twisting motion on the actuator rod. Typically the actuator rod will bend or even break under such a force, rendering the actuator flag and the position sensing limit switches inoperative.

It is clear then, that a need exists for an improved limit switch actuator rod and an improved connection between the actuator rod and the chain take-up pneumatic cylinder piston in a power and free conveyor system. Such a limit switch actuator and connection should prevent damage to the actuator rod from any twisting motion imparted to the pneumatic piston.

SUMMARY OF THE INVENTION

The present invention is directed to an improved limit switch actuator for actuating position indicating limit switches in a drive chain take-up for a power and free conveyor system. The improved actuator includes an actuator rod which is movable relative to a stationary pneumatic take-up cylinder. A flag is attached to the actuator rod and is positioned such that, as the actuator rod is moved relative to the take-up cylinder, the flag actuates a series of position indicating limit switches. The actuator rod is linked to a piston in the take-up cylinder via a connecting plate. The connecting plate has a first and a second aperture through which the actuator rod and the piston, respectively, extend. The second aperture, through which the piston extends, is reinforced and is slightly oversized, i.e. larger in diameter than the piston such that the piston is rotatable relative to the connecting plate. Thus, the piston is free to rotate under the torque effects of a take-up chain as the chain is straightened. At the same time, the connecting plate remains stationary, thus preventing the rotation of the piston from being imparted to the actuator rod.

OBJECTS AND ADVANTAGES OF THE INVENTION

The principal objects of the present invention include: providing an improved limit switch actuator for a power and free conveyor drive chain take-up; providing such a limit switch actuator for use with a pneumatic take-up cylinder with a selectively extendable and retractable take-up piston; providing such a limit switch actuator which includes an elongate actuator rod which is connected to the take-up piston; providing such a limit switch actuator in which the connection between the piston and the actuator rod is via a connecting plate with the piston being rotatable relative to the connecting plate; providing such a limit switch actuator which allows for reliable conveyor chain take-up position indicating by accommodating for any torque effects on the take-up cylinder due to chain straightening; and providing such a limit switch actuator which is of relatively simple construction, is economical to manufacture and install and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a top plan view of the drive chain take-up system of FIG. 1 with a chain pulley shown in phantom lines and with portions broken away to show a pneumatic take-up cylinder and limit switch actuator.

FIG. 3 is an enlarged, fragmentary, side elevational view of the pneumatic take-up cylinder and take-up piston and the limit switch actuator with flag and associated position indicating limit switches.

FIG. 4 is a greatly enlarged, partial, cross-sectional view of the pneumatic take-up cylinder and take-up piston connected to the actuator rod, taken along line 4—4 of FIG. 2 and illustrating a connecting plate with a reinforced piston support supporting the take-up piston such that it is rotatable relative to the connecting plate and the actuator rod.

FIG. 5 is a pneumatic schematic diagram of the conveyor chain take-up system.

FIG. 6 is an electrical schematic diagram of the indicators and shut downs actuated by the limit switches.

DETAILED DESCRIPTION OF THE INVENTION

Figure 1:
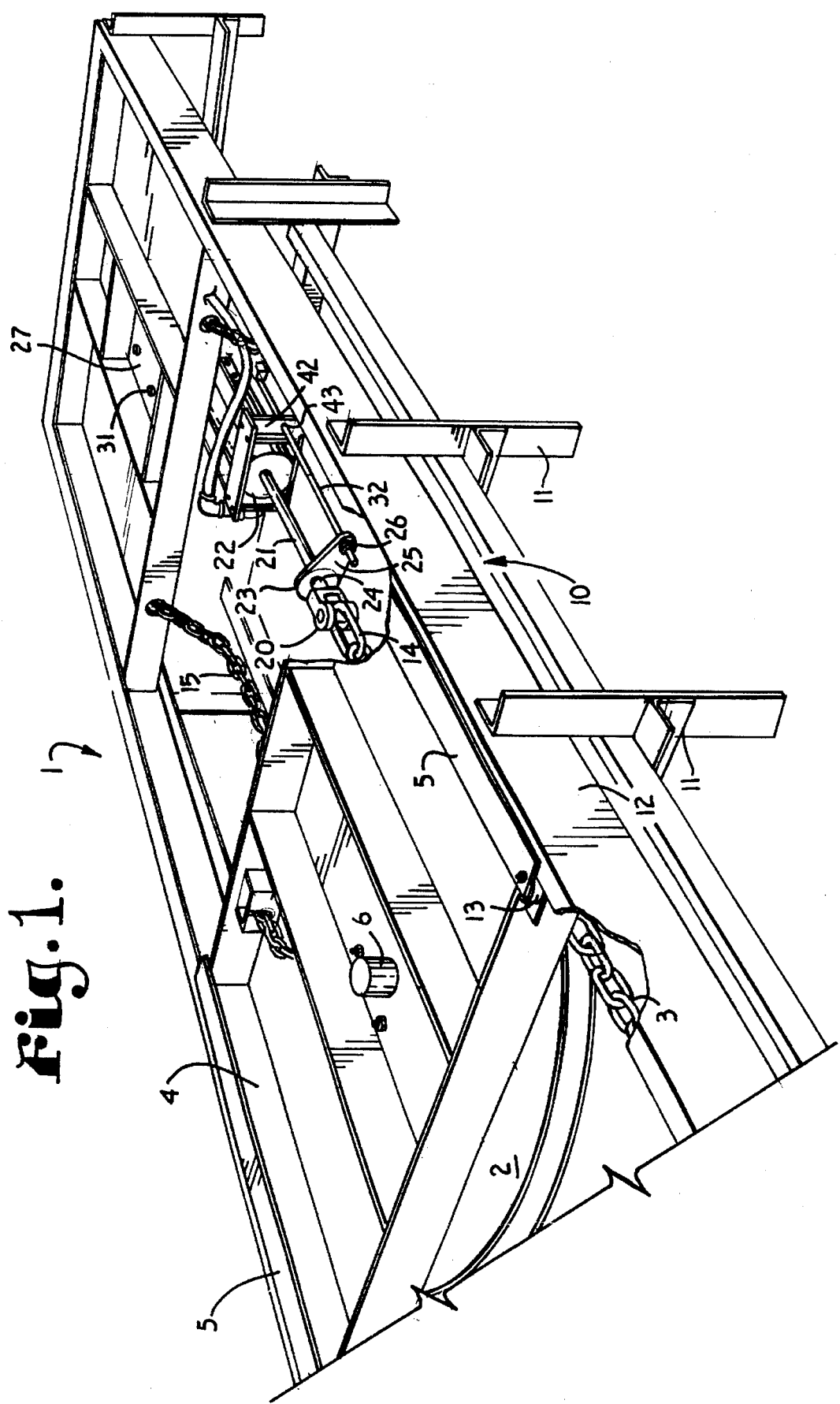
FIG. 1 is a perspective view of a drive chain take-up system for a power and free conveyor with the take-up system incorporating a limit switch actuator in accordance with the present invention.

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, a power and free conveyor drive chain drive take-up is generally indicated at 1. The chain drive take-up 1 includes a large rotatable drive chain pulley 2 about which an endless conveyor drive chain 3 extends. The pulley 2 is attached to a movable carriage 4 equipped with a pair of angle members 5. An axle 6 supports the pulley 2 with the axle 6 being bolted to the carriage 4 via a plurality of bolts 7. A frame 10 includes legs 11 which support horizontal frame members 12. The angle members 5 overlap the horizontal frame members 12. A number of bearings 13 allow the carriage 4 to be movable relative to the frame 12. The carriage 4 can also be supported by casters (not shown) attached beneath the carriage 4.

The carriage 4 is attached to a take-up chain 14 and one or more safety chains 15. The take-up chain 14 extends between the carriage 4 and a clevis 20 attached to a take-up piston 21 which is selectively extendable and retractable via a pneumatic take-up cylinder 22. A connecting plate 23 includes an opening 24 through which the piston 21 extends. The connecting plate 23 can be made of reinforced steel with the opening 24 being slightly oversized, i.e. the opening 24 is of a slightly larger diameter than the piston 21 such that the connecting plate 23 is free to rotate relative to the piston 21. The connecting plate 23 includes an extension 25 through which a second opening 26 extends. The take-up cylinder 22 is attached to a stationary support plate 27 via a bracket 28 and bolts 31. The opening 26 is sized to accommodate an actuator rod 32. The actuator rod 32 includes threads 33 for accommodating a pair of nuts 34 and 35 for rigidly attaching the actuator rod 32 to the plate extension 25. At the same time, the connecting plate 23 is held in position along the piston 21 by a pair of keepers 41.

The actuator rod 32 is thus constrained to move in and out along with the piston 21. The actuator rod 32 is supported by a number of plates 42 (one of which is shown in FIG. 1) through which apertures 43 are formed. The actuator rod 32 is thus free to move, through the apertures 43, back and forth along the side of the pneumatic cylinder 22. A plurality of limit switches 44, 45 and 46 are attached alongside the pneumatic cylinder 22 with each limit switch including a respective spring loaded switch actuator 51. Each of the switches 44–46 is a normally open switch, as shown schematically in FIG. 6, and each switch 44–46 is connected to selectively control a respective alarm and/or conveyor shut down 52–54. The actuator rod 32 carries a limit switch flag 55 attached near one end thereof, which flag 55 is positioned and oriented to contact the switch actuators 51 in turn as the rod 32 and flag 55 are moved with the piston 21.

Referring to FIG. 6, the alarm 54 is a chain stretch alarm which indicates when the conveyor drive chain 3 is stretched to the point that it needs immediate maintenance such as the replacement of a link or links, for example. The chain stretch alarm 54 also shuts down the conveyor until the required maintenance is performed. The chain stretch alarm 54 is controlled by the limit switch 46, which is actuated when the piston 21 is fully retracted by the pneumatic cylinder 22, i.e. all possible slack has been taken out of the drive chain 3. The alarm 53 is a chain stretch warning alarm which indicates to an operator of the conveyor that the chain is becoming stretched and is near its limit so that maintenance should be scheduled soon. The chain warning alarm 53 is controlled by the limit switch 45, which can be positioned at any point along the cylinder 22, but preferably near the limit switch 46. Finally, the alarm 54 is an air shut down alarm which is controlled by the limit switch 44. The switch 44 is positioned at the opposite end of travel of the piston 21 at a position where it will be contacted by the flag 55 when the cylinder 22 or a compressed air source to the cylinder 22 fails, i.e. when the piston 21 is fully extended, thus allowing maximum slack in the drive chain 3. This is a very dangerous condition and the alarm 52 also immediately shuts down the conveyor.

Referring to FIG. 5, a schematic diagram of the pneumatic system for the chain take-up 1 is illustrated and generally indicated at 59. The pneumatic system 59 includes a T connection 60 into a source of plant air such as the line 61 and into a primary air line 62. Air pressure in the line 61 is typically in the range of 80–120 lbs per sq. in., for example. A second T connector 63 connects just below the T connector 60 to route to a bypass line 64. Within the primary air line 62, a filter and air pressure regulator 65 is positioned. The regulator 65 reduces air pressure in the primary line to, for example, 40 lbs. per sq. in. A third T connector 71 reconnects the primary line 62 and the by-pass line 64 and a fourth T connector 72 is connected to split the primary line 62 into two paths 73 and 74 with the path. 73 being connected to an operating end 75 of the of the pneumatic cylinder 22. The path 74 is connected to a bleed air end 76 of the cylinder 22. A plurality of ball valves 81 are positioned in the pneumatic system 59 such that air under pressure can be selectively directed from the plant line 61 through the regulator 65 to the operative end 75 of the cylinder 22. Alternatively, when pressure within the cylinder 22 is to be released, a path can be made from the bleed end 76 of the cylinder 22, out the bypass line 64 and to the plant line 60 or other outlet (not shown) or pressure can be equalized between the operative end 75 and the bleed air end 76 of the cylinder 22. Under normal conditions, however, the pneumatic system 59 places a stretching or tensioning force on the conveyor drive chain 3 by the operation of compressed air into the operative end 75 of the pneumatic cylinder 22. With this constant stretching pressure on the drive chain 3, as supplied by the cylinder 22, the position of the actuator rod 32 and the connected flag 55 is used to actuate alarms and conveyor shut downs 52–54, which indicate abnormal chain or compressed air conditions, as explained above.

Referring to FIGS. 2 and 4, the take,up piston 21 is connected to the carriage 4 via the take-up chain 14. The take-up chain 14 can be, for example, approximately 7 feet long. Often, when maintenance is performed on the take-up system 1 or the conveyor itself, the take-up chain 14 is removed and then replaced. With a long chain such as the take-up chain 14, during replacement it is not uncommon for the chain 14 to be twisted 180 degrees or more. When the cylinder 22 is charged with compressed air, a force of several tons is imparted to the take-up chain 14 as slack is taken up in the drive chain 3. If the take-up chain 14 is twisted, it often quickly rotates 180 degrees, 360 degrees or more, depending upon the number of twists in the take-up chain 14. This rotation is translated to the piston 21, which is free to turn within the cylinder 22. However, the oversized opening 24 in the connecting plate 23, which is preferably lubricated, allows the connecting plate 23 to remain stationary while the piston 21 twists within the connecting plate 23. Note the change in position of the piston clevis 20 between FIGS. 2 and 3. This allows the actuator rod 32 to remain stable relative to the cylinder 22 and to thus give a true indication of the extension position of the piston 21. By contrast, in systems without the stabilizing connection provided by the connecting plate 23, the actuator rod 32 would be subject to violent twisting action, thus resulting in damage or destruction of the rod 32, as well as the flag 55 and, possibly, some or all of the limit switches 44–46.

The inventive chain take-up 1 has been illustrated and described as being of use with an inverted power and free conveyor but it could readily be adapted to a conventional power and free system in which the power track is disposed vertically above the free track. In such a system, the drive chain pulley 2 would, of course, be inverted from the orientation illustrated herein.

It is thus to be understood that while certain forms of the present invention have been illustrated and described herein, it is not to be limited to the specific forms or arrangement of parts described and shown.

What is claimed and desired to be secured by Letters Patent is as follows:

1. A take-up position indicator for use with a drive chain take-up system in a power and free conveyor, said take-up system including a stationary take-up cylinder with a selectively extendable and retractable take-up piston connected to a conveyor drive chain pulley such that movement of the piston in one direction takes up slack in the conveyor drive chain while movement of the piston in the opposite direction increases slack in the drive chain, said take-up position indicator comprising:

a. at least one limit switch positioned proximate said take-up cylinder with said limit switch(es) being stationary, each said limit switch including a movable switch arm;

b. an actuator rod which is movable with respect to said take-up cylinder, said actuator rod being connected to said take-up piston such that it is movable therewith; and c. flag means attached to said actuator rod and positioned such that, as said actuator rod moves with said piston, said flag means contacts the movable switch arm of said limit switch(es) to provide an indication of take-up piston position.

2. A take-up position indicator as in claim 1, wherein said actuator rod is connected to said take-up piston via a connecting plate, said connecting plate including a first aperture through which said actuator rod extends and a second aperture through which said take-up piston extends.

3. A take-up position indicator as in claim 2, wherein said second aperture is sized such that said take-up piston is rotatable relative to said connecting plate.

4. A take-up position indicator as in claim 3, wherein there are a plurality of said limit switches with a first of said limit switches being positioned to control a chain stretch alarm.

5. A take-up position indicator as in claim 4, wherein said chain stretch alarm is operative to shut down said conveyor.

6. A take-up position indicator as in claim 4, wherein a second of said limit switches is positioned to control a chain stretch warning.

7. A take-up position indicator as in claim 4, wherein said take-up cylinder is pneumatic and a second of said limit switches is positioned to control a compressed air supply alarm.

8. A take-up position indicator as in claim 7, wherein said compressed air supply alarm is operative to shut down said conveyor.

9. A take-up position indicator for use with a drive chain take-up system in a power and free conveyor, said take-up system including a stationary take-up cylinder with a selectively extendable and retractable take-up piston connected to a conveyor drive chain pulley such that movement of the piston in one direction takes up slack in the conveyor drive chain while movement of the piston in the opposite direction increases slack in the drive chain, said take-up position indicator comprising:

a. a plurality of limit switches positioned proximate said take-up cylinder with said limit switches being spaced along said take-up cylinder and being stationary, each said limit switch including a movable switch arm;

b. an actuator rod which is movable with respect to said take-up cylinder, said actuator rod being connected to said take-up piston such that said take-up piston is rotatable relative to said actuator rod but such that said actuator rod is movable longitudinally therewith; and c. flag means attached to said actuator rod and positioned such that, as said actuator rod moves with said piston, said flag means sequentially contacts the movable switch arms of said limit switches to provide an indication of take-up piston positions.

10. A take-up position indicator as in claim 9, wherein said actuator rod is connected to said take-up piston via a connecting plate, said connecting plate including a first aperture through which said actuator rod extends and a second aperture through which said take-up piston extends, said second aperture being sized such that said take-up piston is rotatable relative to said connecting plate.

11. A take-up position indicator as in claim 9, wherein a first of said limit switches is positioned to control a chain stretch alarm.

12. A take-up position indicator as in claim 11, wherein said chain stretch alarm is operative to shut down said conveyor.

13. A take-up position indicator as in claim 11, wherein a second of said limit switches is positioned to control a chain stretch warning.

14. A take-up position indicator as in claim 11, wherein said take-up cylinder is pneumatic and a second of said limit switches is positioned to control a compressed air supply alarm.

15. A take-up position indicator as in claim 14, wherein said compressed air supply alarm is operative to shut down said conveyor.

16. A take-up position indicator for use with a drive chain take-up system in a power and free conveyor, said take-up system including a stationary take-up cylinder with a selectively extendable and retractable take-up piston connected to a conveyor drive chain pulley such that movement of the piston in one direction takes up slack in the conveyor drive chain while movement of the piston in the opposite direction increases slack in the drive chain, said take-up position indicator comprising:

a. a plurality of limit switches positioned proximate said take-up cylinder with said limit switches being spaced along said take-up cylinder and being stationary, each said limit switch including a movable switch arm;

b. an actuator rod which is movable with respect to said take-up cylinder, said actuator rod being connected to said take-up piston via a connecting plate, said connecting plate including a first aperture through which said actuator rod extends and a second aperture through which said take-up piston extends, said second aperture being sized such that said take-up piston is rotatable relative to said connecting plate and to said actuator rod but such that said actuator rod is movable longitudinally therewith; and c. flag means attached to said actuator rod and positioned such that, as said actuator rod moves with said piston, said flag means sequentially contacts the movable switch arms of said limit switches to provide an indication of take-up piston positions.

17. A take-up position indicator as in claim 16, wherein a first of said limit switches is positioned to control a chain stretch alarm.

18. A take-up position indicator as in claim 17, wherein said chain stretch alarm is operative to shut down said conveyor.

19. A take-up position indicator as in claim 17, wherein a second of said limit switches is positioned to control a chain stretch warning.

20. A take-up position indicator as in claim 17, wherein said take-up cylinder is pneumatic and a second of said limit switches is positioned to control a compressed air supply alarm, said compressed air supply alarm being operative to shut down said conveyor.

* * * * *